March 2, 1971   L. D. EVANS   3,566,570

FASTENER FOR WINDOW MOLDINGS

Original Filed Oct. 3, 1967   2 Sheets-Sheet 1

INVENTOR.
LYON D. EVANS
BY
Charles L. Townsend
attorney

March 2, 1971 L. D. EVANS 3,566,570
FASTENER FOR WINDOW MOLDINGS
Original Filed Oct. 3, 1967 2 Sheets-Sheet 2
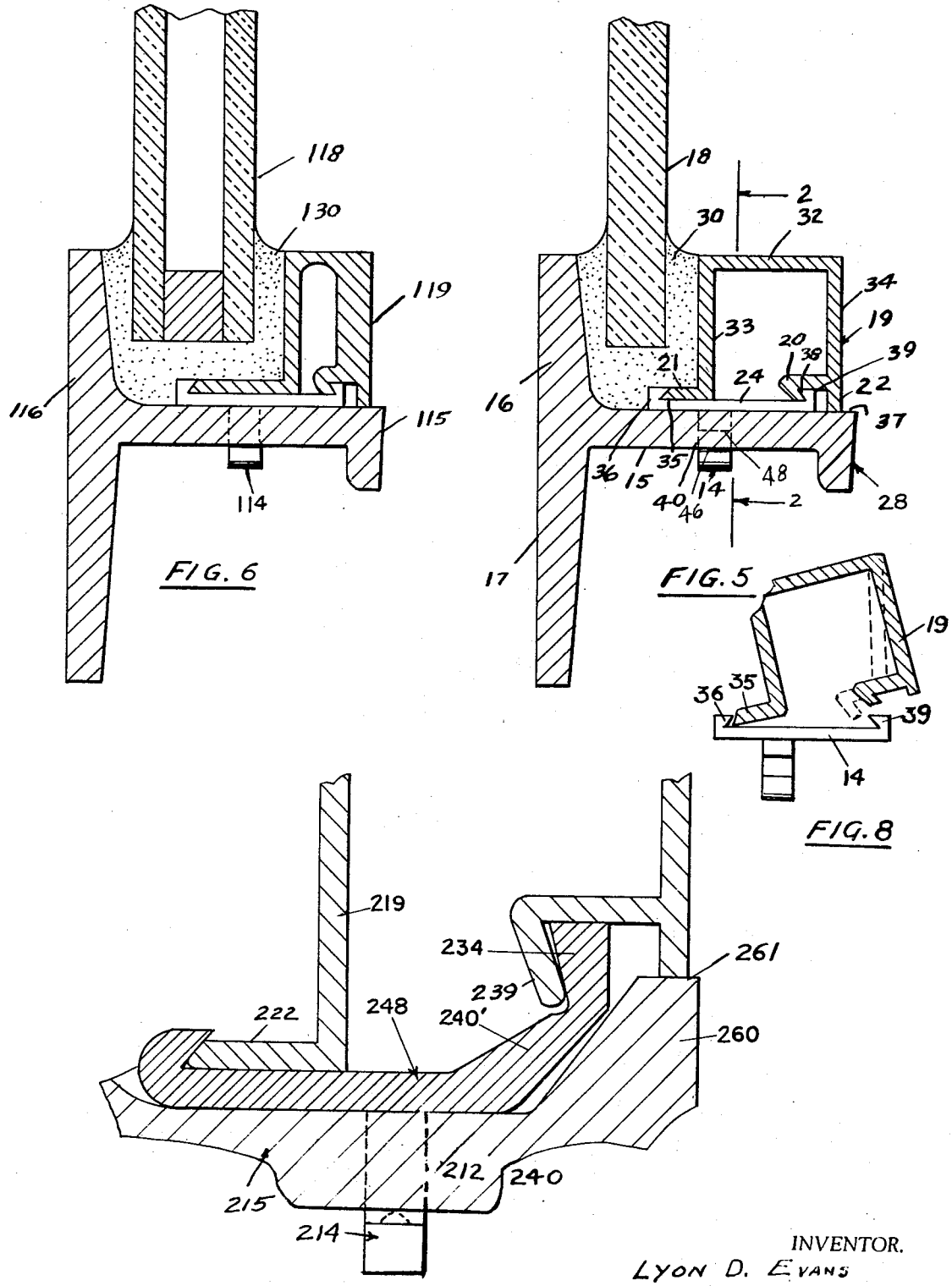
INVENTOR.
LYON D. EVANS United States Patent Office 3,566,570
Patented Mar. 2, 1971

3,566,570
FASTENER FOR WINDOW MOLDINGS
Lyon D. Evans, Lakewood, N.Y., assignor to Hope's Windows, Inc., Jamestown, N.Y.
Continuation of application Ser. No. 672,553, Oct. 3, 1967. This application Nov. 13, 1969, Ser. No. 871,626
Int. Cl. E04f *19/02;* E06b *3/54*
U.S. Cl. 52—498                              7 Claims

ABSTRACT OF THE DISCLOSURE

This disclosure relates to windows and more particularly, to an improved means of glazing windows. The improved means compensates a clip having a plate-like body member, a first locking blade, a second locking blade and a glazing bead retention means. The locking blades extend through an opening in a support member and a glazing bead for the window is attached to the retention means.

---

This application is a continuation of copending application Ser. No. 672,553, filed Oct. 3, 1967, now abandoned.

In the invention disclosed herein, a snap-in head system is provided for window bars made from hot rolled steel shapes having no undercuts. It is based upon using a series of small, specially shaped clips which are inserted into the steel section and into which an extruded aluminum head or molding of a type similar to that commonly used to glaze steel windows and which is usually held down with screws, is inserted. These clips are inserted in small punched slots in the steel window sections. The clips are designed so that they are locked in on one edge and will not fall out in handling. In spite of the large variety of existing steel window sections, only a minimum number of designs of clip is necessary to cover the entire variety of varying web thicknesses, glazing profiles, other profile differences, and required space for setting glass in steel window bars because such variations are accommodated by varying the design of the aluminum bead and not the design or position of the clip.

Each of the clips is specifically dimensioned so that its height is low enough to permit a panel or pane of glass to be inserted with sufficient rebate coverage without removal of the clip itself. It is contemplated for the clips disclosed to be used for any type of installation when a panel and/or molding is to be held in place, for example, in automobile bodies, refrigerator cabinets, furniture, installation of decorative molding on any sheet-like or plate-like member. The clip can also be used to hold a decorative molding as well as holding, retaining, or confining other structural or decorative parts.

The prior art includes steel windows, many of which are still in use, which were glazed by using spring clips and putty. This is unsightly and unsatisfactory. Another method of glazing involved the use of metal moldings held down with screws. This system is also expensive. It requires drilling, tapping and considerable factory preparation and hand fitting each bead to line up the holes and ends, and allow proper space for the glass. Other systems of glazing have been utilized but all of them have limitations.

It is, accordingly, an object of the invention to provide an improved clip.

Another object of the invention is to provide a glazing clip which is simple in construction, economical to manufacture and simple and efficient to use.

Another object of the invention is to provide an improved combination clip molding and window section.

With the above and other objects in view, the present invention consists of the combination and arrangement of parts hereinafter more fully described, illustrated in the accompanying drawings and more particularly pointed out in the appended claims, it being understood that changes may be made in the form, size, proportions, materials used, and minor details of construction without departing from the spirit or sacrificing any of the advantages of the invention.

In the drawings:

FIG. 5 is a cross sectional view taken on line 5—5 of FIG. 1;

FIG. 6 is a view similar to FIG. 5 of another embodiment of the invention;

FIG. 7 is a cross sectional view similar to FIGS. 5 and 6 of another embodiment of the invention; and FIG. 8 is a view of the clip and a molding in position to be inserted.

Figure 1:
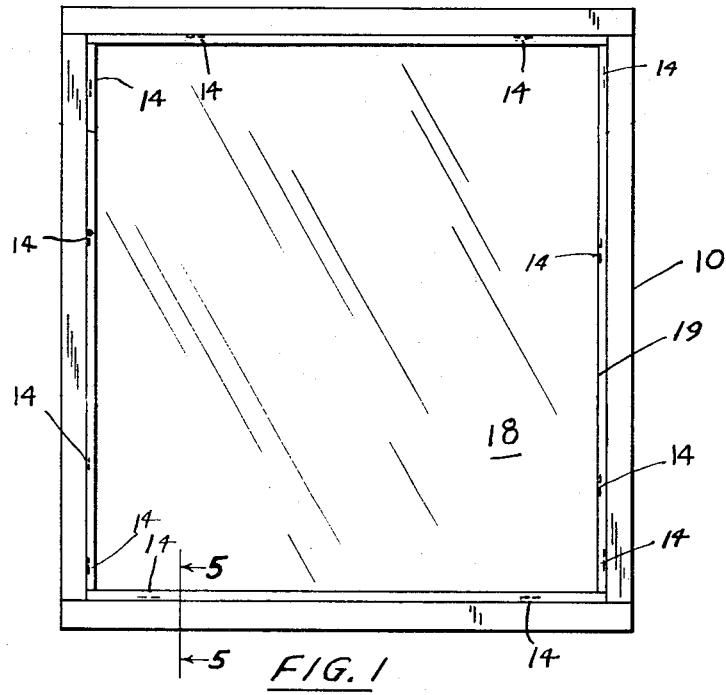
FIG. 1 is a front view of a window utilizing the clip according to the invention.

Now with more particular reference to the drawings, in particular FIGS. 1 through 5, the assembled window frame is indicated generally as 10. The window has the usual glass panel 18, glazed in position by glazing material 30, which is disposed between the bead 19 and the upper part 16 of the vertical flange of the bar 28.

The caulking material 30 is held in position by the bead 19, which is supported on the horizontal leg 15 of the window bar. This bead is held thereto by the spaced clips 14. Clips 14 may be disposed in the bars on all four sides of the window.

The bead 19 may be made of a suitable aluminum extrusion and the bars may be made of steel members of a type familiar to those skilled in the art. The clip can be used on any flat panel made of any hard material as, for example, a panel of an automobile body to support a molding for decorative purposes.

The extruded bead 19 may be generally square in cross section, as shown in FIG. 5, and have a top horizontal leg 32 connected to the vertical legs 33 and 34. A horizontal leg or extension 21 extends laterally from the leg 33 and terminates in a sharp edge 35 that is received under the dovetail leg 36 of the clip 14. The edge 35 could be attached directly to vertical leg 33, thus eliminating leg 21.

The lower end 22 of the leg 34 rests on the upper surface 37 of the window bar and an intermediate lug 20 extends inwardly from the leg 34 and has a downwardly and outwardly extending portion 38 that is received under the dovetail undercut retention lip 39 of the clip 14.

The clip 14 has two spaced downwardly extending blade portions 11 and 13, which define a slot 41. These blade portions 11 and 13 together may be considered to define a single locking blade 12. In some applications, the blade portions 11 and 13 could be made as a single integral blade without the slot 41 which separates them.

The blade portion 13 is relatively thin, and in a typical example it may be one-eighth inch thick. A hook 25 is integrally attached to the blade portion 13. The hook terminates at its distal end in a raised portion 45. A hump 46 may be integrally formed on top of the raised portion 45. The blade portion 13 is relieved at 47 and a ledge 48 is formed below the relieved portion 47. Thus, the vertical edge of slot 40 indicated at 49, through leg 15, engages surface 48 of the blade portion 13 when the blade is in position through slot 40 in a window bar as shown in FIG. 2.

Figure 2:
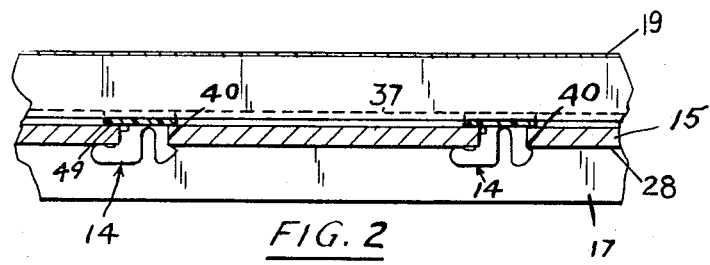
FIG. 2 is a cross sectional view taken on line 2—2 of FIG. 5.
Figure 3:
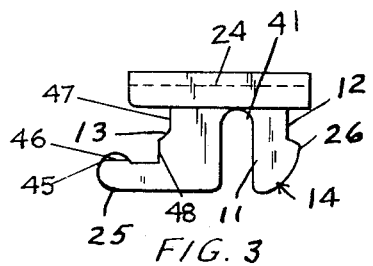
FIG. 3 is an enlarged side view of one embodiment of the clip.
Figure 4:
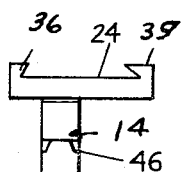
FIG. 4 is a front view of the embodiment of the clip shown in FIG. 3.

The blade portion 11 terminates at its lower end in hook 26 which underlies the horizontal surface 15 when the clip is in the position shown in FIGS. 1 and 2.

The clip has a plate-like member 24 which has spaced retention lips 36 and 39 integrally attached thereto. The retention lips form a dovetail joint to receive the bead 19 which flexes to engage as shown in FIG. 5. An adhesive may be applied to the bottom side of platelike member 24 so that it can be sealed to the top surface 37 to hold the clip 14 more securely if need be and prevents water leaking through slot 40. The relieved portion 47 allows the clip to be moved freely into position in an arc in slot 40. Slot 41 allows the blade portions 11 and 13 to be forced toward each other while the blade 14 is being inserted.

In operation, there must be two or more clips, for example, for each side of panel 18 of glass. The clips will be installed in spaced slots 40.

Each of the clips will be dimensioned in height above the surface 37 so that it will permit sufficient rebate coverage without removal of the clips during the installing of panel or glass. The retention lips 36 and 39 retain the glazing bead 19 and the specially shaped stem 12 of the bead, which goes through the slots 40 in the window bar, allows the clips to be inserted at an angle and as the clip 14 is pushed down into the flat position, hook 25 on portion 13 comes up tight against the lower surface of the horizontal flange 15 of the bar. Portion 13 may be of a resilient material that will yield slightly thus permitting use of the clip on surfaces where leg 15 may vary in thickness. This locking stem 13 prevents the clip from being lifted straight up out of the slot in the bar, before the bead 19 is put in place and after the bead is snapped into two or more clips. A forward force on the panel 18, will introduce a shearing force on the locking stem 12 of the clip. This is the action that glazing bead 19 will transmit to the clip when the bead is snapped onto two or more of the clips. A window pane or panel is placed in position behind the clips, and a force applied perpendicular to it, such as wind might exert on a pane of glass. The blade portion 11 of the locking stem 12 has a hump 26 which depresses and then snaps under leg 15 of bar 28 when the blade is forced into the slot 40. This action is necessary to prevent the clip from falling out before a bead is snapped into place on the clips or after the bead has been removed.

The bead 19 is inserted in the clips 14 by holding the bead at an inclined angle to the clips 14, inserting the extension 21 under the retention lip 36, then rocking the bead downward toward the retention lip 39, resiliently deflecting the leg 34 of the bead toward the leg 33 and moving the lip 38 past the retention lip 39. The resiliency of the bead will then cause the leg 34 of the bead to deflect outwardly so that the member 38 underlies the retention lip 39. A force such as an impact on the side 32 of the bead may be exerted to cause the bead to seat firmly in the clips 14. The bead can be removed by reversing the steps mentioned above without damage to the bead or the clips by applying a force on leg 34.

The bead can also be inserted by sliding the bead longitudinally relative to the retention lips 36 and 39, so that the extension 21 and member 28 slide along the retention lips 36 and 39.

In the embodiment of the invention shown in FIG. 6, a different design of bead from that shown in FIGS. 1–5. The bead is indicated at 119. This bead 119 is constructed to allow for a thicker panel or glass 118 between the glazing bead 119 and flanges 116 of the bar 115. The glazing material 130 is supported between the flange 116 of the bar 115 and the bead 119. The clip 114 is identical except in modified dimension to clip 14 shown in FIGS. 1–5.

In the embodiment of the invention shown in FIG. 7, a clip 214 is slightly different than the clip 14 and 114.

The clip is shown attached to bar 260 with blade 212 extending through hole 240 in bar 260. The clip 214 has a retention lip 234 disposed on the upwardly diverging end 240 of the horizontal portion of the clip. The end 240 is disposed at approximately thirty degrees to the flat part. The retention lip 234 is inclined to the top surface of the intermediate member so that it overlies end 239 of bead 219. This type of clip is adaptable for use with a standard type window bar having a raised portion 261 on the front edge of flange 215. Leg 222 of bead 219 rests on the clips 214.

The foregoing specification sets forth the invention in its preferred practical forms, but the structure shown is capable of modification within a range of equivalents without departing from the invention which is to be understood is broadly novel as is commensurate with the appended claims.

The embodiments of the invention in which an exclusive property or privilege is claimed are defined as follows:

1. In combination a glazing bead and a clip, said clip comprising a platelike body member having an underside adapted to rest on a platelike support member,
   retention means on said platelike body member on the side thereof remote from said underside attaching said glazing bead to be supported on said platelike support member,
   a locking blade on said underside of said platelike body member,
   said locking blade comprising a first relatively thin platelike blade member integrally attached to said body member and extending generally perpendicularly therefrom,
   a second locking blade comprising a second platelike blade member integrally attached to said body member and extending generally parallel to said first platelike blade member,
   a first relatively long hook integrally attached to said first platelike blade member and spaced from said underside and having a side adjacent and extending along said underside,
   a hump on said hook member adapted to engage the underside of a support member,
   and a second hook on said second blade member spaced from said body and on the side of said body remote from said first blade member,
   said second hook being adapted to underlie and engage said support member.

2. The combination recited in claim 1 wherein said retention means comprise spaced members each having a surface diverging from the other end toward said platelike member and defining a dovetail space for receiving a complimentary dovetail-like member on a molding.

3. The combination recited in claim 1 said platelike support member is a window bar,
   said window bar having a flange and a hole therein spaced from said flange,
   said locking stem being received in said hole.

4. The combination recited in claim 3 wherein
   a panel is disposed between said flange and said glazing bead,
   and glazing material is placed between said glazing bead and said flange.

5. In combination, a bar, a panel, and a clip,
   said bar having a horizontal flange and a vertical flange,
   a hole in said horizontal flange spaced from said vertical flange,
   a clip having means inserted in said hole,
   said clip defining a space between said clip and said vertical flange,
   said panel being disposed in said space,
   said clip having means comprising a flat platelike hook extending through said hole on the side thereof adjacent said horizontal flange for engaging said horizontal flange both on the side of said horizontal flange adjacent said clip and on the side thereof remote from said clip whereby said clip is held in position in said hole, and plate means on said clip for engaging a molding, said clip having a relatively flat underside adapted to rest on a platelike member, retention means on said platelike member for supporting a device on said platelike member, a locking blade on the side of said platelike member remote from said retention means, said locking blade being adapted to be inserted in a hole in said platelike member, said locking blade comprising a first relatively thin platelike blade member extending generally perpendicular to said flat platelike member, said locking blade comprising a second relatively thin platelike blade member spaced from said first blade member and fixed to said flat platelike member and adapted to extend through said hole, a first relatively long hook on said first platelike blade member and adapted to be disposed with its top surface spaced from and generally parallel to said relatively platelike member, a second hook on said second blade member on the side thereof opposite said first hook member, a hump on said relatively long hook member, said hump being spaced from said first blade member and adapted to engage the underside of said platelike member.

6. The combination recited in claim 5 wherein at least two said clips are provided, said means on said clip for engaging and retaining said panel comprises a supplemental member engaging said clips holding said clips together.

7. The combination recited in claim 5 wherein said clip is made of a single integral piece of material, and said means on said clip for engaging or retaining said panel comprises a supplemental member adapted to be fixed to said clip.

References Cited

UNITED STATES PATENTS

| 661,986 | 11/1900 | Heizer | 248—224 |
| 3,015,869 | 1/1962 | Rapata | 24—73.7 |
| 3,066,902 | 12/1962 | Cowil | 24—73.7X |
| 807,888 | 12/1905 | Wallace | 248—224 |

JOHN E. MURTAGH, Primary Examiner

U.S. Cl. X.R.

52—717; 24—73